United States Patent [19]

Shimojo

[11] Patent Number: 5,072,339
[45] Date of Patent: Dec. 10, 1991

[54] OPEN TYPE VEHICLE

[76] Inventor: Jin Shimojo, 2-20, Momijigaoka, Fuchu-Shi, Tokyo-To, Japan

[21] Appl. No.: 513,915

[22] Filed: Apr. 24, 1990

[30] Foreign Application Priority Data

Apr. 24, 1989 [JP] Japan .................................. 1-47810

[51] Int. Cl.5 ................................................ B62J 6/00
[52] U.S. Cl. ........................................ 362/72; 362/75
[58] Field of Search ...................... 362/72, 73, 75, 83; 280/202, 152.1; 180/219; 224/30 R, 32 R, 32 A

[56] References Cited

U.S. PATENT DOCUMENTS

| 2,283,442 | 5/1942 | James | 362/72 X |
| 2,694,138 | 11/1954 | Schwinn | 362/102 |
| 3,269,773 | 8/1966 | O'Connor | 362/72 |
| 4,050,615 | 9/1977 | Kline | 224/32 A |
| 4,051,361 | 9/1977 | Lichon et al. | 362/72 X |
| 4,085,317 | 4/1970 | Mithoff | 362/72 |
| 4,356,536 | 10/1982 | Funabashi et al. | 362/72 |
| 4,690,237 | 9/1987 | Funabashi et al. | 280/202 |
| 4,711,381 | 12/1987 | Felder | 362/72 X |
| 4,845,599 | 7/1989 | Lievin | 362/72 |
| 4,901,209 | 2/1990 | Nitz | 362/72 |

FOREIGN PATENT DOCUMENTS

| 512630 | 7/1952 | Belgium | 362/72 |
| 1300650 | 6/1962 | France | 362/72 |
| 570496 | 12/1957 | Italy | 362/72 |
| 96570 | 8/1939 | Sweden | 362/72 |
| 319446 | 3/1957 | Switzerland | 362/72 |

Primary Examiner—Ira S. Lazarus
Assistant Examiner—Richard R. Cole
Attorney, Agent, or Firm—Ladas & Parry

[57] ABSTRACT

An open type vehicle such as motorcycle or bicycle has a vehicle body including a seat upon which a rider sits. An illuminating lamp is arranged at a rear portion of the vehicle body for illuminating the back of a rider to clearly inform the existence of the open type vehicle to vehicles or pedestrians behind the open type vehcile, thus securing the safe driving of the open type vehicle.

10 Claims, 7 Drawing Sheets

OPEN TYPE VEHICLE

BACKGROUND OF THE INVENTION

The present invention relates to an open type vehicle such as a motorcycle, bicycle or scooter provided with an illuminating lamp means particularly for securing the safe driving thereof at sunset or night.

A vehicle such as motorcycle, bicycle or scooter is often driven at sunset or night while illuminating a head light to secure safety of the front portion. The bicycle is equipped with a reflecting plate at a rear portion of the bicycle body so that a vehicle such as automobile running behind the bicycle can discriminate the existence of the bicycle and maintain a proper distance between the vehicle and the bicycle for the sake of safety. The motorcycle is provided with a numberplate lamp or flasher lamp at the rear portion thereof for the same purpose.

Furthermore, with respect to a motorcycle such as a police motorcycle, a rider wears a jacket, to a back portion of which is applied a V-type fluorescent light reflecting band so that the existence of the police motorcycle is discriminated by vehicles driving behind the same.

As described above, conventional motorcycles or bicycles are equipped with rear light reflecting plates or other like members or means so that vehicles running behind the motorcycle or bicycle can discriminate the existence thereof for securing safe driving.

However, it will be said that these conventional members or means attached to the motorcycles or bicycles cannot sufficiently attain their functions for discriminating the existence of motorcycles or bicycles with respect to the vehicles running behind them. Furthermore, the V-type fluorescent light reflecting jacket of the rider on a police motorcycle can attain its function only by reflecting the light from the vehicle running behind the police motorcycle and, accordingly, this function will not be attained in a case where the vehicle running behind the police motorcycle is not equipped with a lighting means.

SUMMARY OF THE INVENTION

An object of the present invention is to substantially eliminate the defects or disadvantages encountered in the prior art and to provide an open type vehicle such as motorcycle or bicycle provided with an illuminating means for discriminating the existence of the vehicle to other vehicles or pedestrians behind the vehicle during driving at night.

This and other objects can be achieved according to the present invention by providing an open type vehicle such as motorcycle or bicycle having a vehicle body characterized in that an illuminating means is arranged at a rear portion of the vehicle body for illuminating the back of a rider on the vehicle.

The illuminating means may be arranged at various portions of members or portions of the vehicle such as motorcycle or bicycle suitable for illuminating the back of the rider sitting on the seat of the vehicle.

According to the open type vehicle of the character described above, the illuminating means illuminates the back of a rider during the driving at night time to bring the back of the rider into relief to inform the existence of the open type vehicle to vehicles or pedestrians behind the open type vehicle, thus securing the safe driving thereof.

BRIEF DESCRIPTION OF THE DRAWINGS

For a better understanding of the present invention and to show how the same may be brought into effect, reference will now be made by way of example to the accompanying drawings, in which.

DESCRIPTION OF THE PREFERRED EMBODIMENTS

Figure 1:
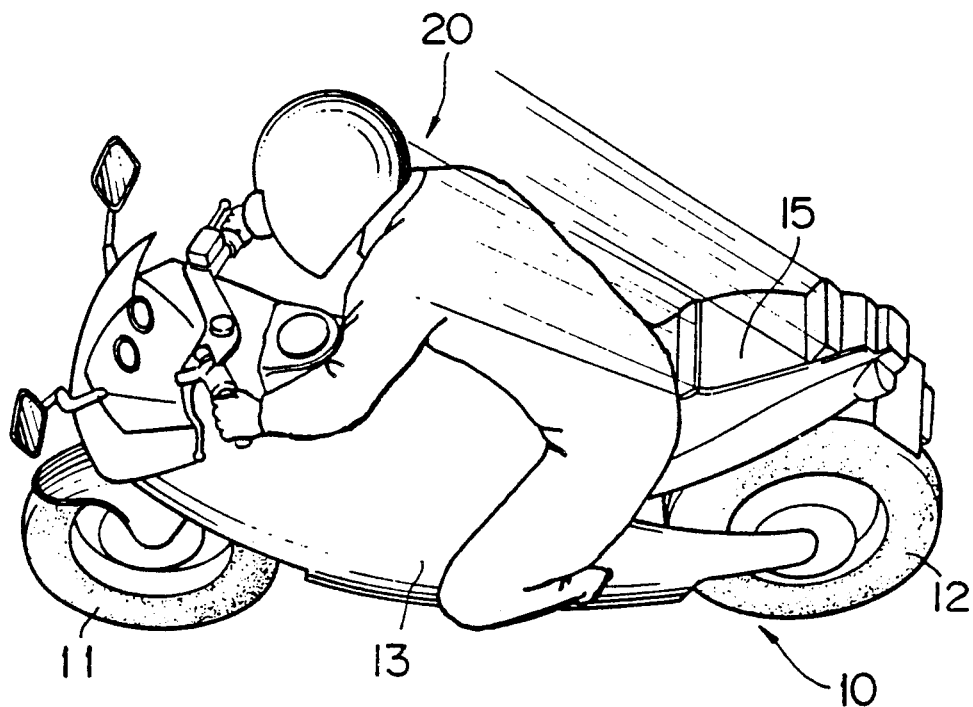
FIGS. 1 to 3 represent a first embodiment of an open type vehicle according to the present invention.
Figure 2:
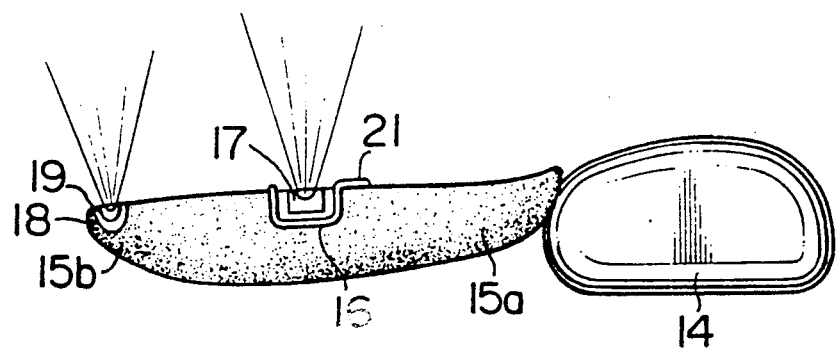
Figure 3:
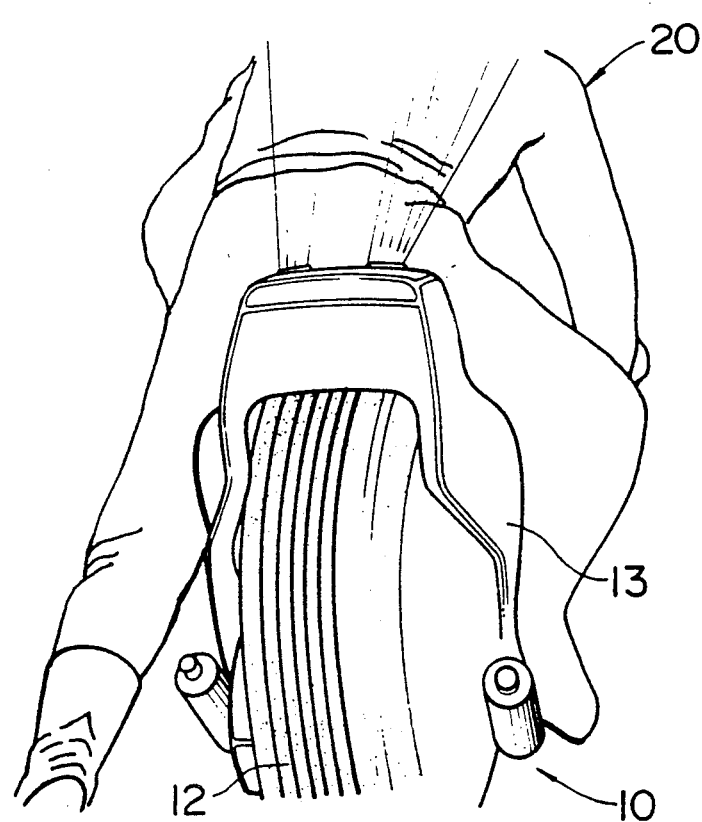

FIGS. 1 through 3 represent a first embodiment of an open type vehicle according to the present invention and, in the illustration, a motorcycle 10 is shown as one typical example of a vehicle of this character. Referring to FIGS. 1 through 3, the motorcycle 10 is equipped with a front wheel 11, a rear wheel 12 and a body 13. A fuel tank 14, a front seat 15a and a rear extra seat 15b are arranged at the upper portion of the body 13 as shown in FIG. 2. A rider 20 rides on the front seat 15a when he drives the motorcycle 10 with the rear seat 15b empty.

An illuminating lamp 17 for illuminating the back of the rider 20 is embedded in a groove 16 formed between the front seat 15a and the rear seat 15b. A further illuminating lamp 19 for illuminating the back of another rider sitting on the rear seat 15b is also embedded in a groove 18 formed at a rear portion of the rear seat 15b. These illuminating lamps 17 and 19 are secured by means of screws or magnets in a detachable manner. These illuminating lamps 17 and 19 may be illuminated by a battery equipped in the motorcycle as a lighting source or by cells contained in the illuminating lamps themselves.

A belt 21 may be further attached to the rear portion of the front seat 15a so that a rider sitting on the rear seat 15b can hold the belt 21 while riding the motorcycle 10.

The embodiment of the construction described above will operate as follows.

It is supposed that only one rider 20 sits on the front seat 15a of the motorcycle 10. When the motorcycle 10 is ridden at night, the illuminating lamp 17 embedded in the groove 16 illuminates the back of the rider 20 concentrically on a body portion between the wast and the back of the rider 20 so that the illuminated light does not leak to the front of the rider 20.

As described, the back of the rider 20 can be illuminated by the lighting of the illuminating lamp 17 during the night riding of the motorcycle 10, so that the existence of the motorcycle 10 can be discriminated by vehicles or pedestrians behind the motorcycle 10.

According to this embodiment, in a case where a glass or plastic lens of a lighting source cover is partially cut out or a light shielding plate is preliminarily provided for the lighting source cover in shape of a V-mark, other mark, symbol or the like, the mark or the like can be projected onto the back of the rider.

Figure 4:
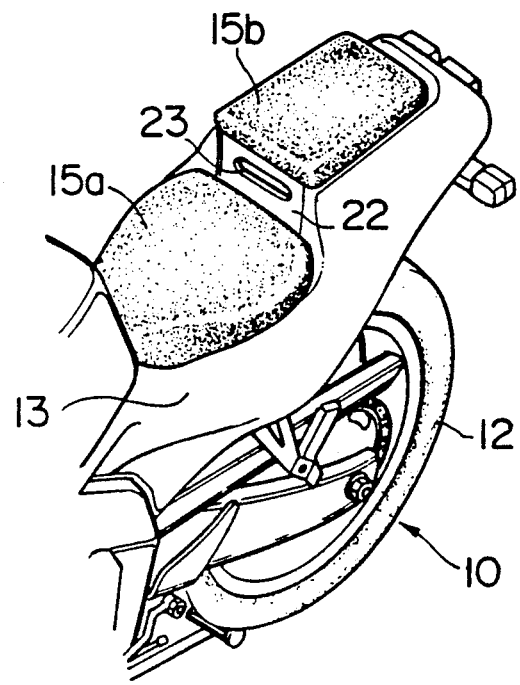
FIG. 4 represents a second embodiment of an open type vehicle according to the present invention.

FIG. 4 shows a perspective view of a rear portion of an open type motorcycle of a second embodiment according to the present invention. The second embodiment differs from the first embodiment only in the arrangement or location of an illuminating lamp and members or portions associated therewith, and the other portions are substantially identical to those referred to with respect to the first embodiment with the same reference numerals.

Referring to FIG. 4, a stepped portion 22 is formed between the front seat 15a and the rear seat 15b, and an illuminating lamp 23 for illuminating the back of the rider 20 sitting on the front seat 15a is arranged in the stepped portion 22.

Figure 5:
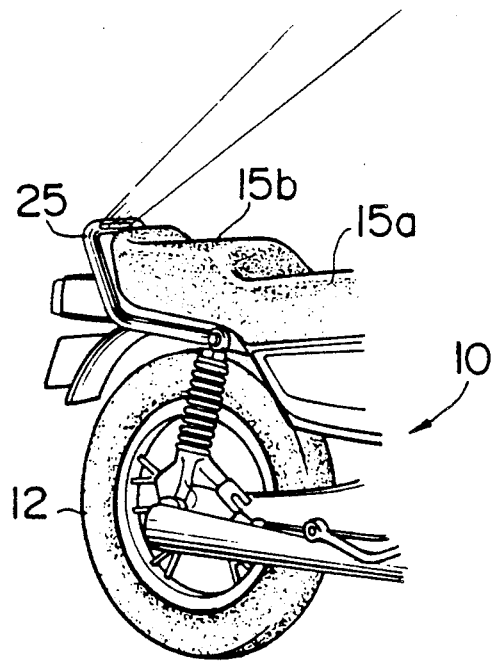
FIGS. 5 and 6 represent a third embodiment of an open type vehicle according to the present invention.
Figure 6:
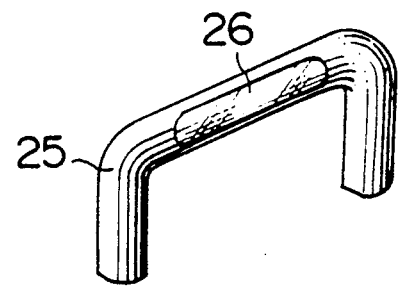

FIGS. 5 and 6 represent a third embodiment of an open type vehicle equipped with an illuminating lamp according to the present invention, in which FIG. 5 is a perspective view showing a rear portion of a motorcycle and FIG. 6 is an enlarged view of a rear side handrail.

Referring to FIGS. 5 and 6, a rear side handrail 25 is arranged at a rear portion of the rear seat 15b. An illuminating lamp 26 for illuminating the back of a rider sitting on the rear seat 15b is embedded in the handrail 25.

Figure 7:
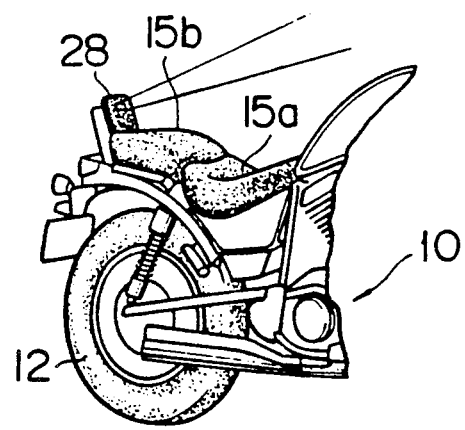
FIGS. 7 and 8 represent a fourth embodiment of an open type vehicle according to the present invention.
Figure 8:
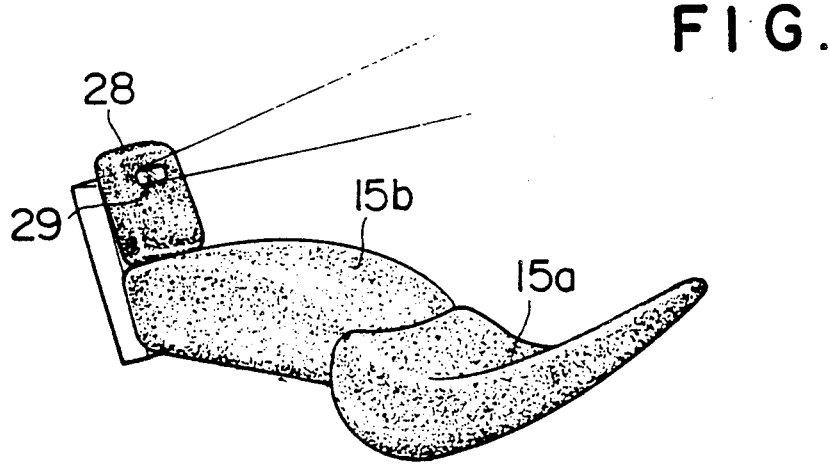

FIGS. 7 and 8 represent a fourth embodiment of an open type vehicle equipped with an illuminating lamp according to the present invention, in which FIG. 7 is a perspective view showing a rear portion of a motorcycle and FIG. 8 is an enlarged view of a seat.

Referring to FIGS. 7 and 8, a back rest 28 for a rider sitting on the rear seat 15b is arranged at a rear portion of the rear seat 15b. An illuminating lamp 29 for illuminating the back of the rider sitting on the rear seat 15b is embedded in the back seat 28.

FIGS. 9 to 14 represent a fifth embodiment according to the present invention.

Figure 9:
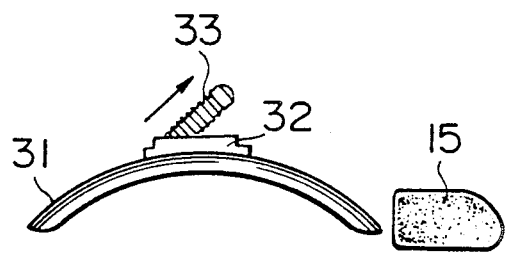
FIGS. 9, 10, 11, 12, 13a, 13b and 14 represent a fifth embodiment of an open type vehicle according to the present invention.
Figure 10:
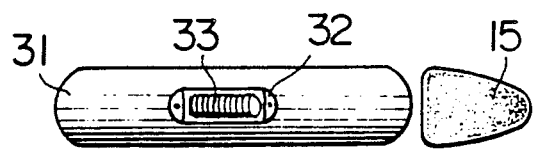
Figure 11:
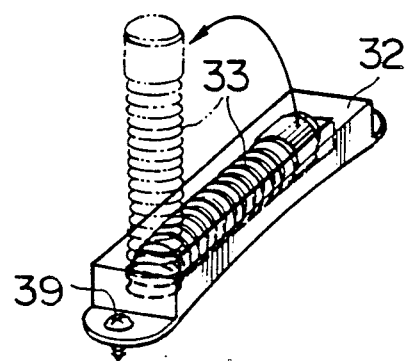
Figure 12:
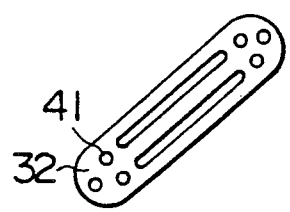

Referring to FIGS. 9 and 10, a motorcycle or bicycle is provided with a rear wheel fender 31 on which a housing box 32 is mounted upwardly. An illuminating lamp 33 for illuminating the back of a rider sitting on the seat is accommodated in the housing box 32. As shown in FIG. 11, the box 32 is secured to the fender 31 by means of screw 39, for example, so that the illuminating lamp 33 is detachably mounted to the box 32. A water drain port 41 is formed in the bottom surface of the accommodating box 32 for preventing rainwater from being stored in the box 32.

Figure 13A:
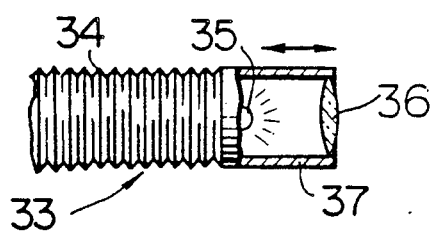
Figure 13B:

As shown in FIGS. 13A and 13B, the illuminating lamp 33 is equipped with a deformable portion 34 in the shape of a bellows, a portion 37 in which a light source 35 and a lens unit 36 are accommodated, and a lens cover (not shown) disposed in front of the portion 37. According to the described construction, the illuminating angle of the illuminating lamp 33 can be optionally changed by deforming the bellows portion 34.

Figure 14:
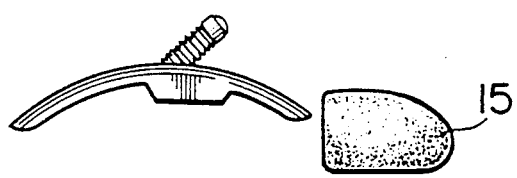

The accommodating box 32 may be mounted on the lower surface of the rear wheel fender 31 as shown in FIG. 14 in place of the location on the upper surface of the rear wheel fender 31 as shown in FIG. 9.

Figure 15:
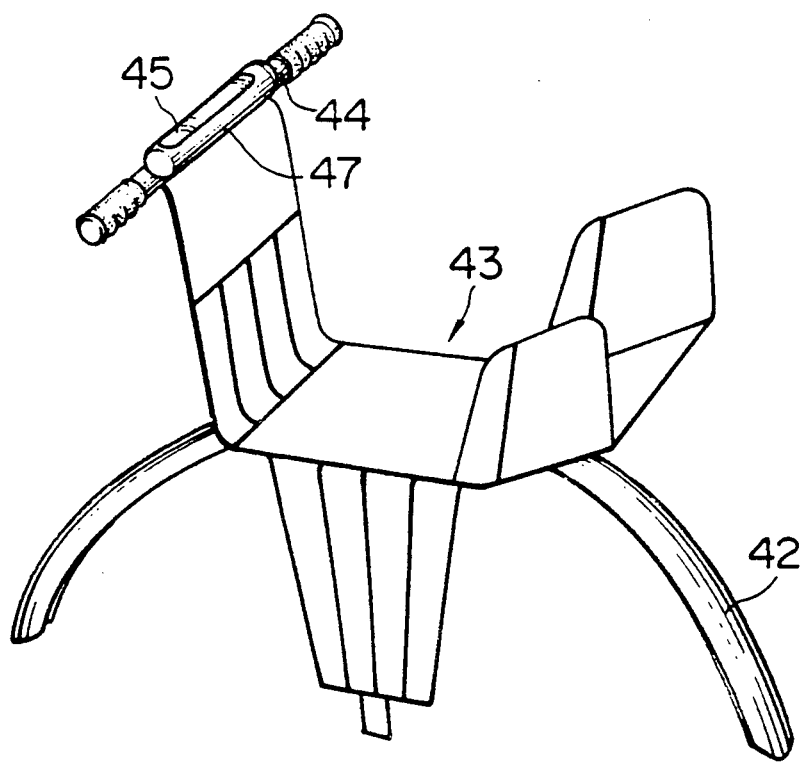
FIG. 15 represents a sixth embodiment of an open type vehicle according to the present invention.

FIG. 15 represents a sixth embodiment according to the present invention.

Referring to FIG. 15, a carrier 43 for a child or an article is mounted on a carrier on the rear wheel fender 42 of a bicycle, for example. An illuminating lamp 45 for illuminating the back of a rider is embedded in a handrail 44 of the carrier 43 and the illuminating lamp 45 is connected to a generator, not shown, of the bicycle through a cord 47 so as to illuminate the lamp 45.

Figure 16:
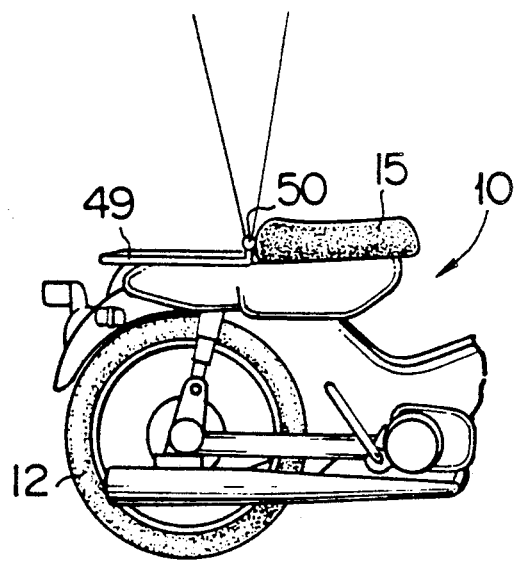
FIGS. 16 and 17 represent a seventh embodiment of an open type vehicle according to the present invention.
Figure 17:
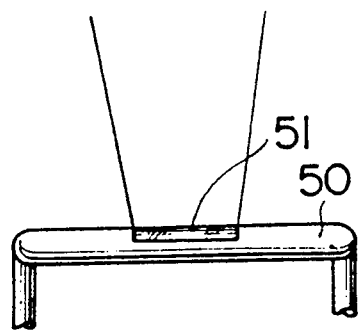

FIGS. 16 and 17 represent a seventh embodiment according to the present invention, in which FIG. 16 is a rear side view of a motorcycle and FIG. 17 is an enlarged view of a handrail attached to the motorcycle shown in FIG. 16.

Referring to FIG. 16, a motorcycle 10 is provided with a seat 15 having a rear portion to which is secured a carrier 49 having a handrail 50 at the front portion thereof. An illuminating lamp 51 for illuminating the back of a rider sitting on the seat 15 is embedded in the handrail 50.

Figure 18:
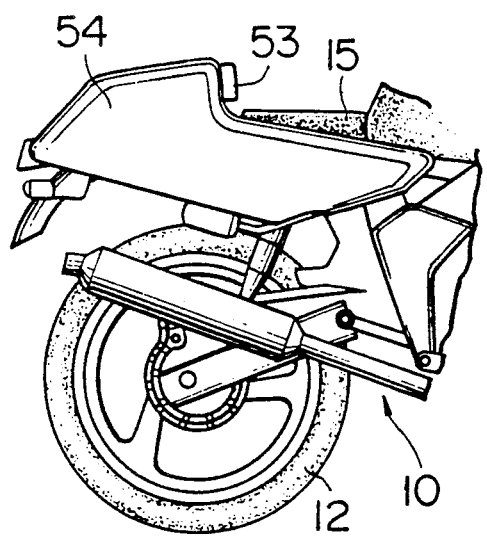
FIGS. 18, 19, 20a and 20b represent an eighth embodiment of an open type vehicle according to the present invention.
Figure 19:
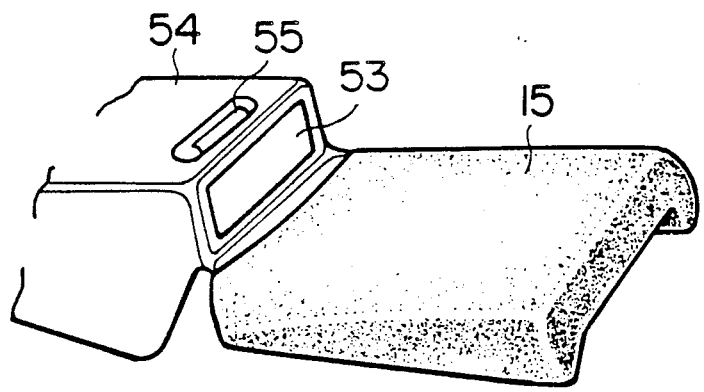
Figure 20A:
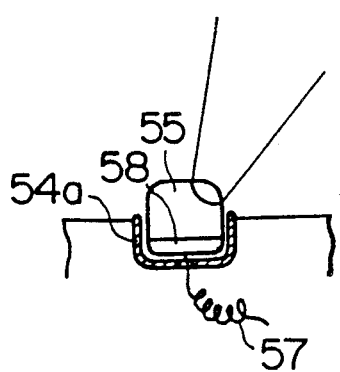
Figure 20B:
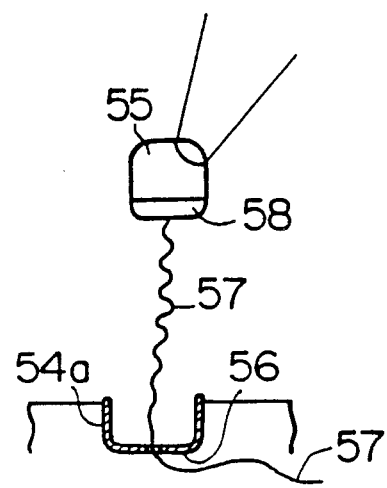

FIGS. 18 to 20 represent an eighth embodiment according to the present invention, in which FIG. 18 is a rear side view of a motorcycle, FIG. 19 is an enlarged perspective view showing a seat of the motorcycle and FIGS. 20A and 20B are views showing the condition to take out an illuminating lamp.

Referring to FIG. 19, a rear body 54 is disposed at a rear portion of the seat 15 and a back rest 53 is provided on the surface on a side of the seat 15 of the rear body 54. The rear body 54 is provided with a groove 54a into which an illuminating lamp 55 for illuminating the back of a rider sitting on the seat is accommodated.

Referring to FIGS. 20A and 20B, a magnet 58 is mounted to the lower portion of the illuminating lamp 55 so that the illuminating lamp 55 detachably accommodated in the groove 54a of the rear body 54 can be secured to the rear body 54 (FIG. 20A). The illuminating lamp 55 can be taken out from the groove 54a when the motorcycle is inspected.

The illuminating lamp 55 may be connected to a power source such as battery through a cord 57, and a water drain port 56 is formed in the groove 54a of the rear body 54 for the draining of rainwater and the like.

Figure 21:
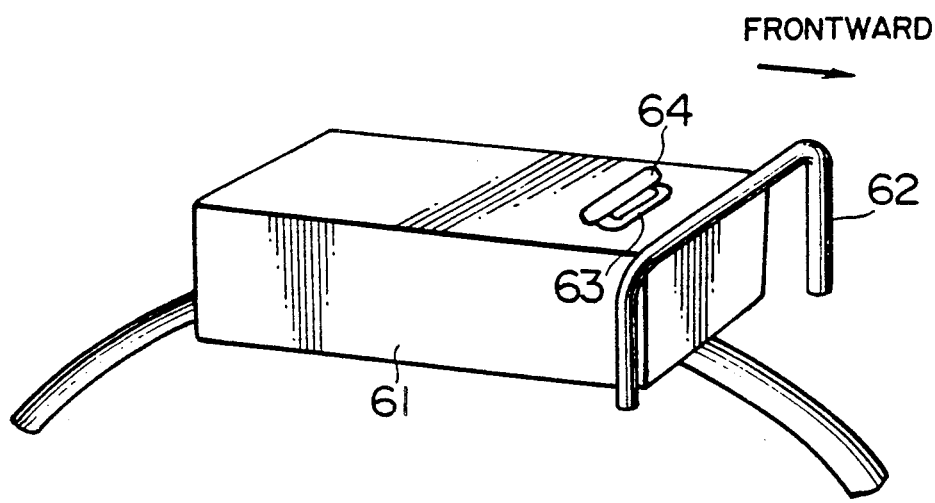
FIGS. 21, 22a and 22b represent a ninth embodiment of an open type vehicle according to the present invention.

FIGS. 21 and 22 represent a ninth embodiment according to the present invention.

Figures 22A, 22B:
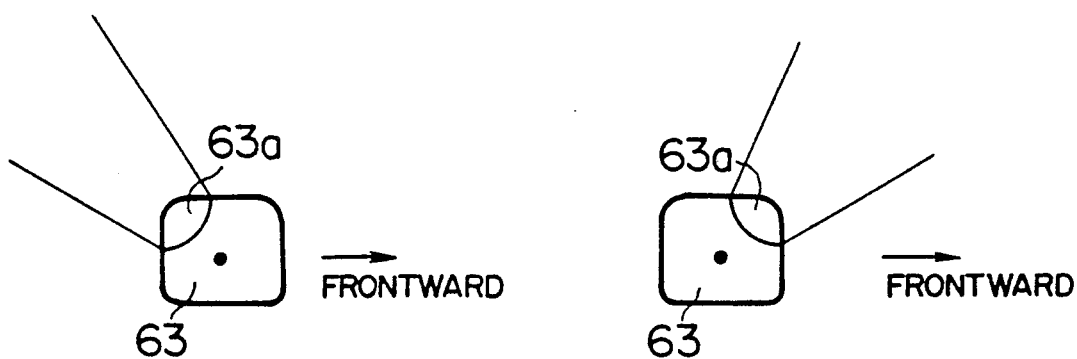

Referring to FIGS. 21, 22A and 22B, a document box 61 is arranged at a rear portion of a motorcycle such as a police motorcycle and a carrier handrail 62 is located between the document box 61 and a seat, not shown. A binder 64 for binding documents is secured to the front portion of the upper surface of the document box 61. A rotatable illuminating lamp 63 is arranged in front of the binder 64. According to this structure, even at night time, the document on the document box 61 can be discriminated by rearwardly rotating an illuminating portion 63a of the illuminating lamp 63 (FIG. 22A) and, otherwise, the back of a rider sitting on the seat can be illuminated by forwardly rotating the illuminating portion 63a of the illuminating lamp 63 (FIG. 22B).

It is to be understood that the present invention is not limited to the preferred embodiments described herein and many other changes and modifications may be made without departing from the scope of the appended claims.

I claim:

1. A motorcycle comprising a seat member including a front seat on which a rider sits and a rear seat on which another rider sits, a groove disposed between the front and rear seats, and an illuminating means embedded in the groove, said illuminating means being arranged so that substantially all the light therefrom is directed to intercept and illuminate the back of the rider sitting on the front seat.

2. An open type vehicle according to claim 1, wherein a further groove is formed at a rear portion of the rear seat and a further illuminating means is embedded in the further groove so as to illuminate the back of a rider sitting on the rear seat.

3. An open type vehicle according to claim 1, wherein the motorcycle is further provided with a handrail disposed at a rear portion of the rear seat and an additional illuminating means is embedded in the handrail so as to illuminate the back of a rider sitting on the rear seat.

4. An open type vehicle according to claim 1, wherein the motorcycle is further provided with a back rest disposed at a rear portion of the rear seat and an additional illuminating means is embedded in the back rest so as to illuminate the back of a rider sitting on the rear seat.

5. A motorcycle comprising a seat member including a front seat on which a rider sits and a rear seat on which another rider sits, both seats being connected through a stepped portion, and an illuminating means embedded in said stepped portion and so arranged that substantially all the light from said illuminating means is directed to intercept and illuminate the back of a rider sitting on the front seat.

6. An open type vehicle according to claim 5, wherein a further groove is formed at a rear portion of the rear seat and a further illuminating means is embedded in the further groove so as to illuminate the back of a rider sitting on the rear seat.

7. An open type vehicle according to claim 5, wherein the motorcycle is further provided with a handrail disposed at a rear portion of the rear seat and an additional illuminating means is embedded in the handrail so as to illuminate the back of a rider sitting on the rear seat.

8. An open type vehicle according to claim 5, wherein the motorcycle is further provided with a back rest disposed at a rear portion of the rear seat and an additional illuminating means is embedded in the back rest so as to illuminate the back of a rider sitting on the rear seat.

9. A motorcycle comprising a seat member on which a rider sits and a rear body member having a groove therein, an illuminating means mounted within said groove, said illuminating means including a magnet for detachably securing the illuminating means within said groove, and said illuminating means being so arranged that substantially all the light therefrom is directed to intercept and illuminate the back of a rider sitting on the seat member.

10. An open type vehicle having a vehicle body characterized in that an illuminating means is arranged at a rear portion of the vehicle body for illuminating a back of a rider on the vehicle, in that the vehicle is a motorcycle and the vehicle body is provided with a seat member on which the ride sits, and a rear body member is disposed at a rear portion of the seat member, and in that the rear body member has a groove into which the illuminating means is accommodated, and the illuminating means has a magnet at a lower portion thereof so as to detachably secure the illuminating means within the groove.

* * * * *